(12) United States Patent
Koehler

(10) Patent No.: US 8,083,648 B2
(45) Date of Patent: Dec. 27, 2011

(54) SPREADING DEVICE FOR ROPE NETWORKS

(75) Inventor: Karl-Heinz Koehler, Berlin (DE)

(73) Assignee: Berliner Seilfabrik GmbH & Co., Berlin (DE)

(*) Notice: Subject to any disclaimer, the term of this patent is extended or adjusted under 35 U.S.C. 154(b) by 495 days.

(21) Appl. No.: 11/911,396

(22) PCT Filed: Apr. 13, 2006

(86) PCT No.: PCT/EP2006/003785
§ 371 (c)(1),
(2), (4) Date: Mar. 17, 2008

(87) PCT Pub. No.: WO2006/108716
PCT Pub. Date: Oct. 19, 2006

(65) Prior Publication Data
US 2008/0210799 A1    Sep. 4, 2008

(30) Foreign Application Priority Data

| | | |
|---|---|---|
| Apr. 13, 2005 | (DE) | 10 2005 017 774 |
| Apr. 13, 2005 | (DE) | 20 2005 006 174 U |
| Jun. 3, 2005 | (DE) | 10 2005 026 412 |
| Jun. 3, 2005 | (DE) | 20 2005 009 003 U |
| Mar. 22, 2006 | (DE) | 20 2006 004 853 U |

(51) Int. Cl.
*A63B 17/00* (2006.01)
(52) U.S. Cl. .......................... 482/36; 114/89
(58) Field of Classification Search ............... 482/33, 482/34, 35, 36, 37, 121, 148; 114/89, 90, 114/91, 100, 101, 97, 102.12
See application file for complete search history.

(56) References Cited

U.S. PATENT DOCUMENTS

| | | | | | |
|---|---|---|---|---|---|
| 1,511,297 | A | * | 10/1924 | Pennoyer | 212/201 |
| 3,201,119 | A | * | 8/1965 | Fenner et al. | 482/38 |
| 3,418,958 | A | * | 12/1968 | Wyatt | 114/89 |
| 3,970,301 | A | * | 7/1976 | Lehmann | 482/35 |
| 4,230,060 | A | * | 10/1980 | McCoy | 114/39.31 |
| 4,561,373 | A | * | 12/1985 | Hackney | 114/89 |
| 5,113,776 | A | * | 5/1992 | Knecht | 114/102.1 |
| 5,988,089 | A | * | 11/1999 | Benoit | 114/102.1 |

FOREIGN PATENT DOCUMENTS

| | | |
|---|---|---|
| DE | 20 64 791 A1 | 6/1972 |
| DE | 73 12 204 U | 4/1976 |
| EP | 1 508 350 A | 2/2005 |

* cited by examiner

*Primary Examiner* — Loan Thanh
*Assistant Examiner* — Tam Nguyen
(74) *Attorney, Agent, or Firm* — Norris McLaughlin & Marcus, P.A.

(57) ABSTRACT

The invention relates to a rope spreading device for rope networks with tensioning ropes that converge at a top point of a support mast at an acute angle. It is an object of the invention to overcome the lack of play space, while making it also possible to vary the tension of the tensioning ropes. Accordingly, a rope spreading device is provided for rope networks with tensioning ropes that converge at a top point of a support mast at an acute angle, wherein the device is characterized in that at least one rope spreader is arranged between a tensioning rope and a support mast. The rope spreader changes the path of the tensioning rope so that a greater usable volume is created between the tensioning ropes and the central support mast, which can be used for climbing and play. Advantageously, the rope spreader may be used to vary the degree of spreading and the tension of the tensioning ropes.

3 Claims, 5 Drawing Sheets

US 8,083,648 B2

SPREADING DEVICE FOR ROPE NETWORKS

Figure 1:
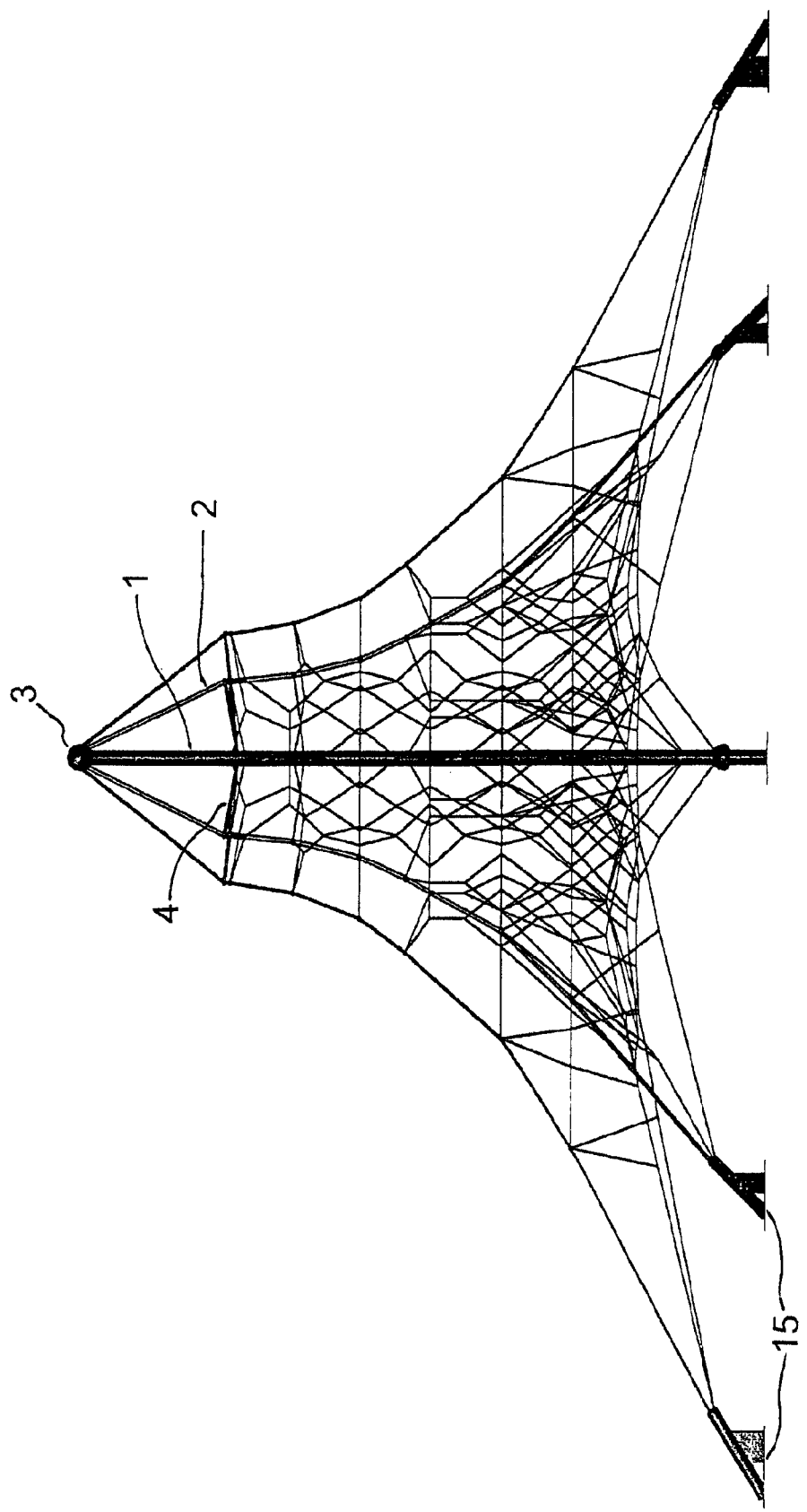

The invention relates to a rope spreading device for rope networks with tensioning ropes that converge at a top point of a support mast at an acute angle.

Two-dimensional and three-dimensional networks of rope netting in combination with variable scaffolding systems have been successfully employed in the design of playgrounds. These networks are suitable for implementing different play worlds with three-dimensional structures that encourage children to exercise. The networks composed of different ropes are tensioned inside a predefined scaffolding system, wherein the scaffolding attains significant flexibility when the individual scaffold rods are connected by spherical hollow bodies, allowing the creation of many interesting geometrically shapes. The rope networks are attached and tensioned inside the scaffolds with the help of mounts disposed on or in the hollow spherical bodies and on the scaffolding rods.

Particular designs of three-dimensional network structures can be attained by arranging the ropes extending from the support masts in a three-dimensional pattern and then tensioning the ropes. The tensioning ropes, which for geometric reasons converge at a top point of a support mast at an acute angle, are typically tensioned with turnbuckles arranged close to the ground at the foundation. In conventionally tensioned playground networks, the actual play volume in the upper region of the support mast becomes increasingly smaller at the top point where the tensioning ropes converge at an acute angle. The disadvantage of a smaller play volume, in particular in the upper and center region of a support mast, becomes particularly apparent with playground networks having a central mast located in the center.

It is an object of the invention to eliminate these disadvantages, namely the lack of play space, while making it also possible to vary the tension of the tensioning ropes.

The object is attained by the features of claim 1. Accordingly, a rope spreading device is provided for rope networks with tensioning ropes that converge at a top point of a support mast at an acute angle, wherein the device is characterized in that at least one rope spreader is arranged between a tensioning rope and a support mast. The rope spreader changes the path of the tensioning rope so that a greater usable volume is created between the tensioning ropes and the central support mast, which can be used for climbing and play. Advantageously, the degree of spreading and the tension of the tensioning ropes can be varied using the rope spreader.

Advantageous embodiments of the invention are recited in the dependent claims.

In an advantageous embodiment of the invention, the rope spreader includes a spreader rod attached to the support mast and to the tensioning rope. The spreader rod is clamped therebetween so as to push the tensioning rope away from the support mast, as compared with the original path of the rope, thereby increasing the play volume. As a result, the spreader rods advantageously combine, both visually and functionally, with the rope network and can be used as part of the climbing scaffold.

In another embodiment of the invention, the spreader rod is movably attached to a rope attachment on the side of the tensioning rope and is pivotally supported on the side of the support mast for articulation about a pivot point of a spreader rod attachment disposed on the support mast. The direction of the path of the tensioning ropes can hereby advantageously be changed by changing the angle between the support mast and the spreader rod.

According to another advantageous embodiment of the invention, the spreader rod attachment is movably secured on the support mast. Because the spreader rod attachment is movable on the support mast in the axial direction, the tensioning ropes can be spread at different positions on the support mast.

According to yet another advantageous embodiment, the spreader rod can be lengthened and shortened in the axial direction. The tension of the tensioning ropes can then be adjusted by changing the length of the spreader rod between the support mast and the tensioning rope, and/or the play volume can be changed by changing the degree of spreading.

The invention will now be described in more detail with reference to an exemplary embodiment and a drawing.

Figure 2:
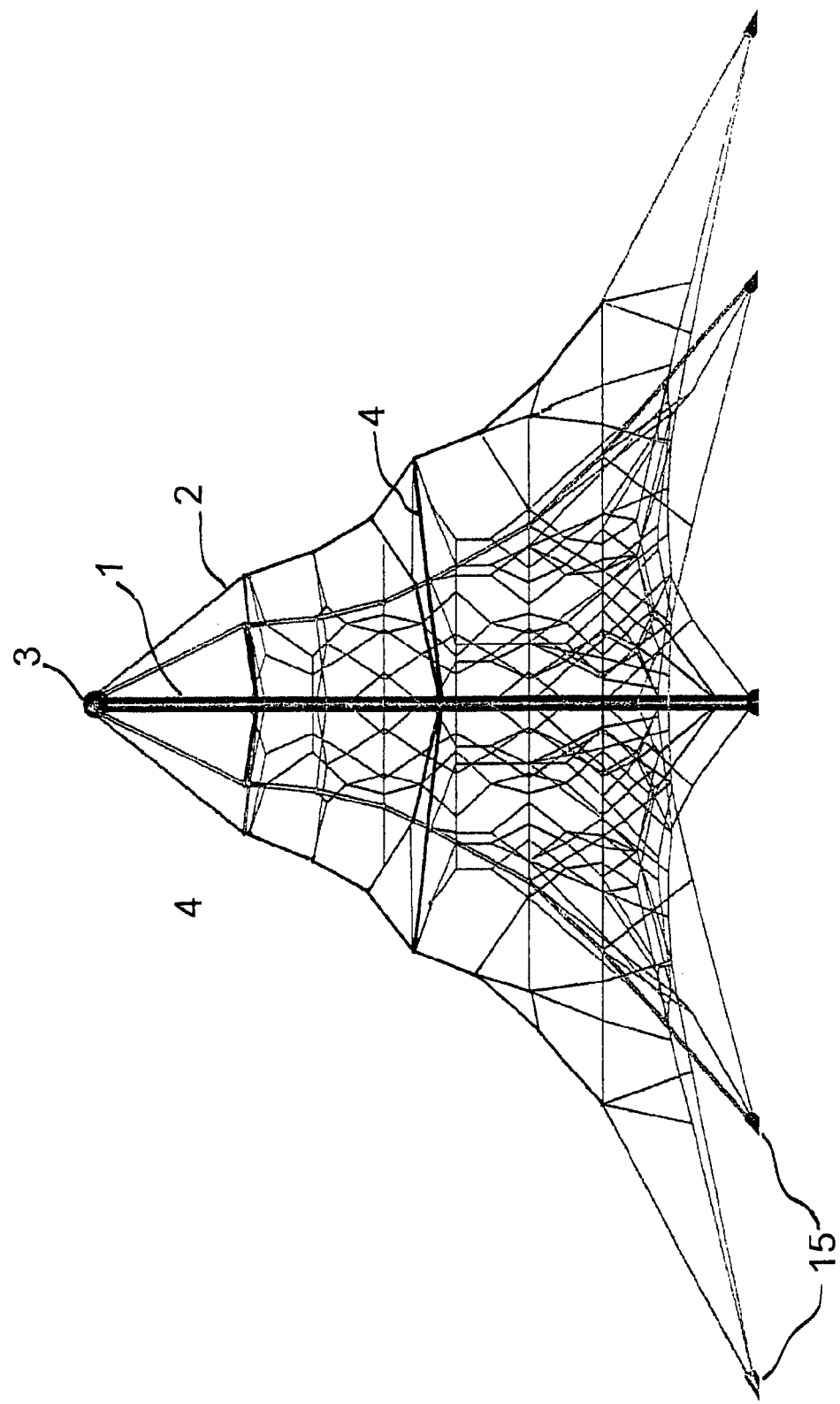
Figure 3:
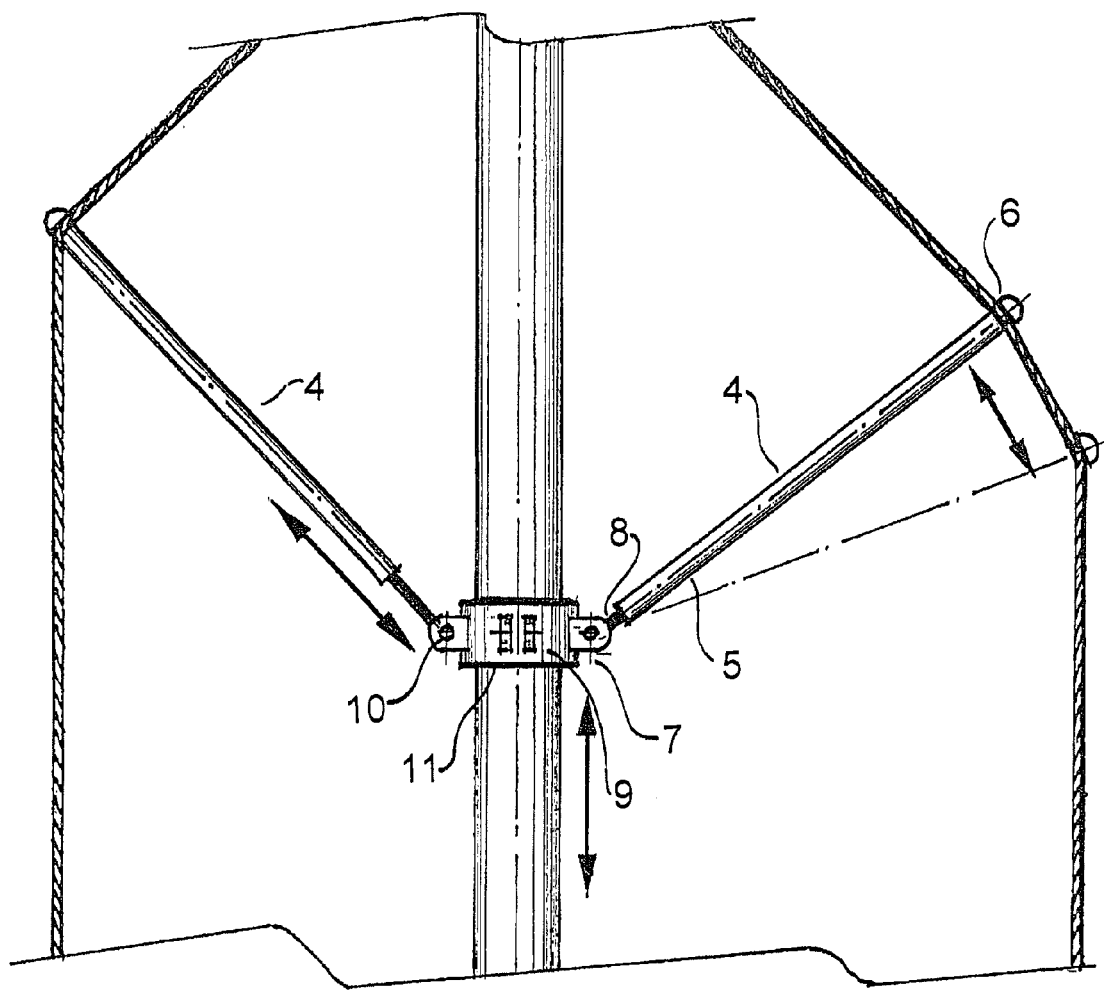
Figure 4:
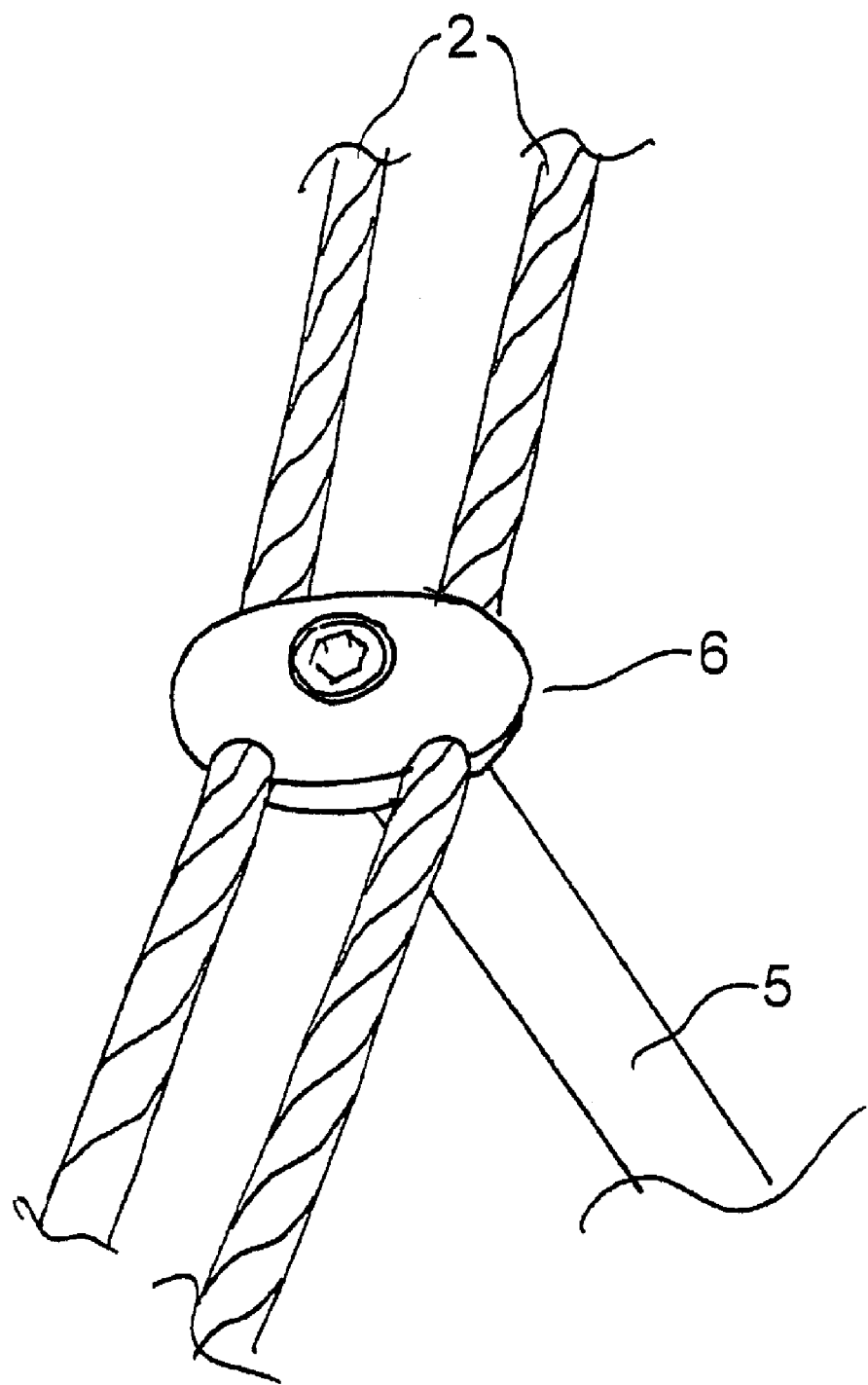
Figure 5:
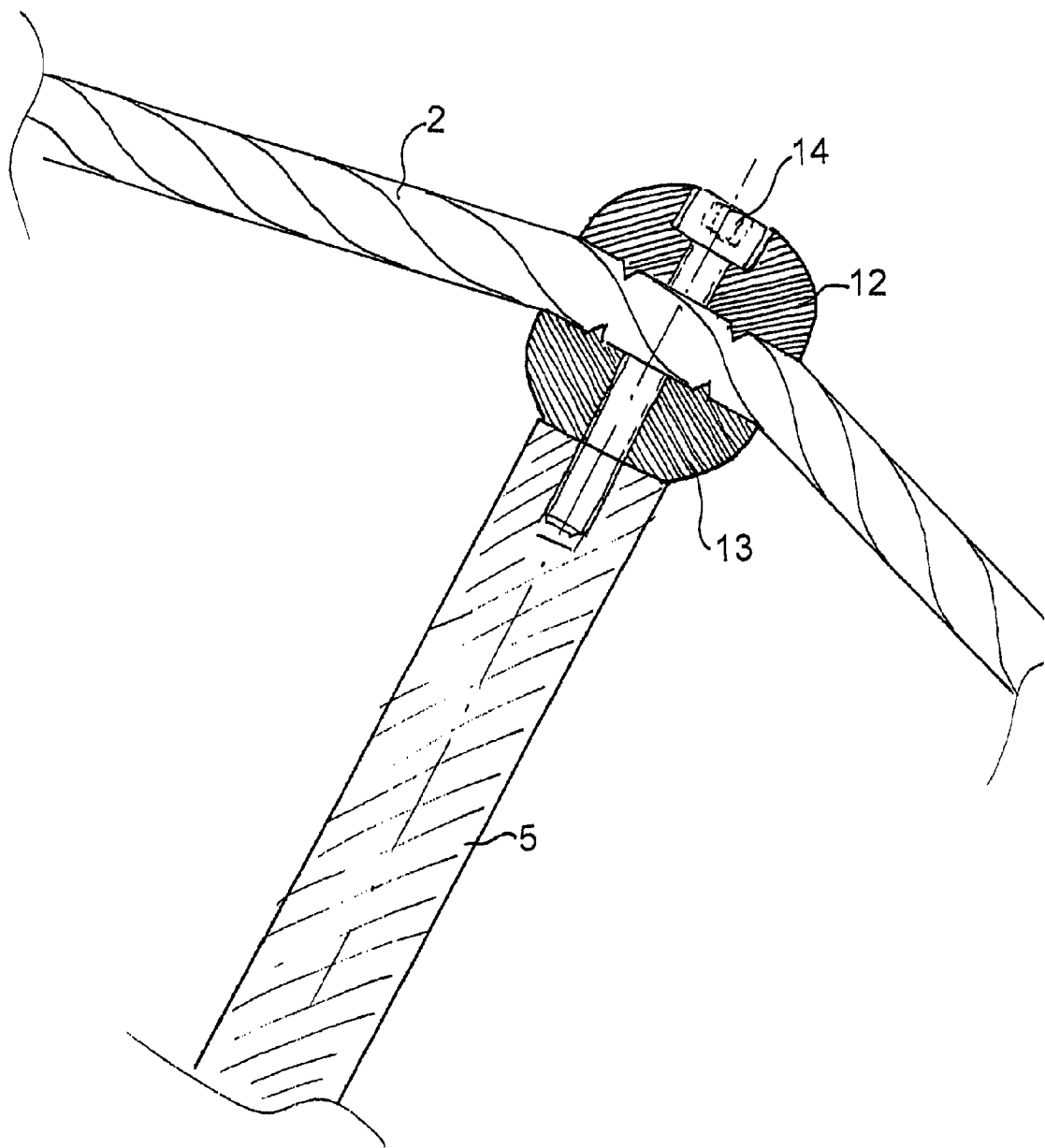

FIG. 1 shows a three-dimensional network with a support mast and a spreader device disposed in the upper region of the support mast, FIG. 2 shows a three-dimensional network with a support mast and rope spreader devices arranged in the upper and the center region of the support mast, FIG. 3 shows a detailed diagram of the rope spreader device, FIG. 4 shows a detailed diagram of the attachment of the spreader rod to the rope, and FIG. 5 shows a cross-sectional view of the rope attachment.

FIG. 1 shows a three-dimensional network, wherein one support mast 1 is implemented as a center mast. Tensioning ropes 2 converge at a top point 3 of the support mast 1 and are securely anchored on the ground by turnbuckles 15. Several rope spreaders 4 are arranged in the upper region of the support mast 1, wherein each tensioning rope 2 has a dedicated rope spreader 4. The tensioning ropes 2, which initially converge at an acute angle, are pushed outward in the spreading region, thereby advantageously producing a larger play volume. Playing children enjoy greater freedom to move in the rope network structures disposed between the tensioning ropes 2.

FIG. 2 shows another three-dimensional network of rope netting with a support mast 1 which is also implemented as a center mast. The tensioning ropes 2 on the outside are retained at the top point 3 of the support mast 1 and on the bottom turnbuckles 15 located close to the ground. Additional rope spreaders 4 commensurate with the number of tensioning ropes 2 are arranged in the center region of the support mast 1, thereby further increasing the play volume. The rope spreaders 4 are designed so as to visually combine in with the existing three-dimensional rope network structures.

FIG. 3 shows an exemplary embodiment of a rope spreader 4. The rope spreader 4 has a spreader rod 5 which is movably attached to a rope attachment 6 on the side of the tensioning rope and is pivotally attached on the side of the support mast for articulation about a pivot point 10 of a spreader sleeve 9. Pivot points 10 are attached to the tensioning sleeve 9, enabling articulation of the spreader rod 5. The spreader rod 5 can be axially lengthened or shortened with a rod extension 8, so that the degree of spreading and the tension of tensioning rope 2 can also be adjusted. For example, the rod extension 8 may be a threaded rod which can be screwed in and unscrewed from the spreader rod 5.

FIG. 4 shows an exemplary embodiment of the rope attachment 6 on the spreader rod 5, employing two tensioning ropes 2.

FIG. 5 shows schematically the rope attachment 6 in cross-section. The two parallel tensioning ropes 2 are securely screwed together in the spreader rod 5 between an upper element 12 and a lower element 13 with a threaded bolt 14. The attachment point of the spreader rod 5 on the tensioning ropes 2 can be moved by reducing the pressing force between the upper element 12 and the lower element 13.

LIST OF REFERENCE SYMBOLS

1 Support mast
2 Tensioning rope
3 Top point
4 Rope spreader
5 Spreader rod
6 Rope attachment
7 Mast attachment
8 Rod extension
9 Tensioning sleeve
10 Pivot point
11 Spreader rod attachment
12 Upper element
13 Lower element
14 Threaded bolt
15 Bottom rope tensioner

The invention claimed is:

1. A three-dimensional network of rope netting, wherein the network of rope netting comprises:
   tensioning ropes that extend on the outside of the network and converge at a top point of a support mast at an acute angle relative to the support mast, wherein the support mast is arranged within the network; and
   at least one rope spreader arranged between at least one tensioning rope of the network of rope netting and the support mast,
   wherein the at least one rope spreader has a spreader rod attached to the support mast and affixed on the at least one tensioning rope, and
   further wherein the spreader rod is moveably attached to a rope attachment on the side of the at least one tensioning rope and is attached on the side of the support mast for articulation about a pivot point of a spreader rod attachment disposed on the support mast.

2. The network according to claim 1, wherein the spreader rod is configured to be lengthened and shortened in an axial direction of the spreader rod.

3. The network according to claim 1, wherein the rope attachment comprises:
   an upper element;
   a lower element; and
   a bolt,
wherein the at least one tensioning rope is secured between the upper and lower elements with the bolt.

* * * * *